United States Patent
Pohlmann

(10) Patent No.: US 9,979,623 B2
(45) Date of Patent: May 22, 2018

(54) ENHANCED DEVICE DISCOVERY TECHNOLOGY

(75) Inventor: Frank Pohlmann, Stuttgart (DE)

(73) Assignee: Sony Corporation, Tokyo (JP)

( * ) Notice: Subject to any disclaimer, the term of this patent is extended or adjusted under 35 U.S.C. 154(b) by 526 days.

(21) Appl. No.: 13/979,561

(22) PCT Filed: Dec. 22, 2011

(86) PCT No.: PCT/EP2011/073827
§ 371 (c)(1),
(2), (4) Date: Jul. 12, 2013

(87) PCT Pub. No.: WO2012/107142
PCT Pub. Date: Aug. 16, 2012

(65) Prior Publication Data
US 2013/0290530 A1    Oct. 31, 2013

(30) Foreign Application Priority Data
Feb. 7, 2011 (EP) .................... 11153570

(51) Int. Cl.
*H04L 12/26* (2006.01)
*H04N 21/4363* (2011.01)
*H04N 21/442* (2011.01)

(52) U.S. Cl.
CPC ... *H04L 43/0876* (2013.01); *H04N 21/43635* (2013.01); *H04N 21/44227* (2013.01); *H04L 43/103* (2013.01)

(58) Field of Classification Search
None
See application file for complete search history.

(56) References Cited

U.S. PATENT DOCUMENTS

| | | | |
|---|---|---|---|
| 6,795,846 B1 | 9/2004 | Merriam | |
| 7,457,870 B1 * | 11/2008 | Lownsbrough | H04L 41/5058 709/217 |
| 8,941,672 B1 * | 1/2015 | Jacoby | G06F 13/14 345/418 |
| 8,959,556 B2 * | 2/2015 | Stokes | H04H 60/32 725/132 |
| 2001/0044840 A1 * | 11/2001 | Carleton | H04L 41/0663 709/223 |
| 2003/0033430 A1 | 2/2003 | Lau et al. | |
| 2005/0138201 A1 | 6/2005 | Soukup | |
| 2008/0244097 A1 * | 10/2008 | Candelore | H04N 21/43615 710/5 |
| 2009/0156051 A1 * | 6/2009 | Doyle | G09G 5/006 439/489 |

(Continued)

OTHER PUBLICATIONS

International Search Report dated Mar. 27, 2012 in PCT/EP11/073827 Filed Dec. 22, 2011.

*Primary Examiner* — Jeffrey R Swearingen
(74) *Attorney, Agent, or Firm* — Oblon, McClelland, Maier & Neustadt, L.L.P.

(57) ABSTRACT

A method for updating information about network devices and/or network services available in a network, the information being stored in a memory, the method including: scanning data packets transmitted on the network, a data packet including at least a destination address field and/or a source address field; evaluating the destination address field and/or the source address field; and updating the information in response to the evaluating.

14 Claims, 1 Drawing Sheet

(56) References Cited

U.S. PATENT DOCUMENTS

| | | | |
|---|---|---|---|
| 2009/0249086 A1* | 10/2009 | Reams | G08C 17/02 |
| | | | 713/300 |
| 2009/0323562 A1* | 12/2009 | Cho | H04W 88/02 |
| | | | 370/277 |
| 2010/0106824 A1* | 4/2010 | Friedrich | H04L 63/08 |
| | | | 709/224 |
| 2010/0223370 A1 | 9/2010 | Kase et al. | |
| 2010/0254397 A1 | 10/2010 | Nishi | |

* cited by examiner

ENHANCED DEVICE DISCOVERY TECHNOLOGY

FIELD OF INVENTION

The present invention relates to a method for updating information about network devices and/or network services available in a network. The invention also relates to a network device, a network with at least one of such network devices and a computer program.

BACKGROUND OF THE INVENTION

Many network implementations available today provide a network device and/or network service discovery. This means that the network devices check or investigate which network devices are available, i.e. in communication with the network. Usually certain messages are specified to be used for the implementation of such a device and/or service discovery. Depending on the implementation, those messages are sent at certain times (e.g. as notification messages after power up or as polling messages in certain time intervals). With an implementation of a notification mechanism (used e.g. when a device or service joints or disjoints a network), it is usually possible to inform other devices about state changes immediately. However, in some circumstances, such as cable removal or power-cut, it is not possible to use the notification mechanism to inform other devices. In this case it is usually a polling mechanism that detects the state change after a certain time.

The implementer of a network device and/or service discovery faces the difficult situation to solve the problem of detecting state changes in a timely manner, versus not to send too many polling messages. Sending too many messages reduces the available time and/or bandwidth for other tasks, especially when communicating on a slow transmission medium. Sending polling messages with a too high time interval results in a longer usage of outdated information and might, therefore, lead to technical problems or to reduced usability.

SUMMARY OF INVENTION

It is, therefore, an object of the present invention to provide a method for updating information about network devices and/or network services available in a network which overcomes the above-mentioned limitation, namely to detect state changes in a timely manner without loading the network with traffic too much.

This object is solved by the method for updating a list of network devices and/or network services available in a network, the information being stored in a memory, comprising the steps of scanning data packets transmitted on the network, a data packet containing at least a destination address field and/or a source address field, evaluating the destination address field and/or the source address field, and updating the information in response to the evaluating step.

This means in other words that the network traffic is scanned and the information contained in the data packets (or messages) is used for updating the information about the network devices and/or network services. At least two pieces of information contained in the data packet are of importance in this context, namely the destination address, preferably together with an acknowledgement information, and the source address. The source address, for example, in a data packet sent over the network clearly indicates that a network device with this address is available. Also the destination address may be used for updating the list in the event that the network device with this destination address acknowledges a data packet at reception time.

Briefly summarized, the main idea of the present invention is to use the information contained in data packets sent for other purposes than network device discovery.

One of the advantages is that no additional network traffic is caused for updating the information about network devices and/or network services available. The method according to the present invention uses the data packets transmitted over the network anyhow for gaining information which allows to update the information of network devices and/or network services available.

A further substantial advantage of the present invention is the fact that the amount of messages/data packets necessary for updating the information scales very well to the amount of network devices sending messages and the amount of messages being sent.

In a preferred embodiment, the step of evaluating comprises:

reading the source address from the source address field, searching the information for a record assigned to a network device with this source address, and updating the record found, preferably with an information that this network device is available.

That means in other words that the address field of a network data packet is read and this information, namely the source or destination address, is used to find the respective network device in the information and to update the record found, e.g. by setting a field of the record, indicating the state of the network device, to, for example, "available".

In the context of the present invention, "record" merely means a piece or element of said information and comprises at least two fields, preferably for a value indicating a network device/network service and at least for a value indicating a status of this network device/network service.

It is to be noted that this structure of the information is just one example and should not be considered as limiting the invention. The information could be structured differently as well.

If the destination address is used, it is also necessary to check an acknowledgement value contained in the data packet. If the acknowledgement value indicates that the data packet has been understood by the destination network device at reception time, the destination address can be used.

In a preferred embodiment, the method is used in an HDMI network. Nevertheless, it goes without saying that the method may also be used in any other type of network, preferably an Ethernet-based local area network or a combined HDMI and Ethernet network.

In a preferred embodiment, the information comprises a record for a network device, the record containing a first field for the address of the network device and a second field for the status of the network device.

It is apparent that the record may contain further fields for additional information relating to a network device In a further preferred embodiment, a step of sending polling data packets to network devices for investigating their availability is interrupted for a predetermined time period.

That means in other words, that the prior art approach which polls messages to network devices within the network to get information about their availability, is not avoided in total, but is instead further used, however, to a substantially reduced extent. The time intervals for sending messages may be significantly increased or may be set dependent on the traffic on the network. If, for example, the network traffic is high, the information to be gained by scanning the data packets is also high, so that sending polling messages is not necessary. However, if the traffic on the network is low, polling messages to the network devices is useful to update the information.

Further, it is to be noted that an interruption of sending polling messages is done on a per device/service basis. It is only interrupted for a device/service for which information had been discovered in a recent time interval.

The object of the present invention is also solved by a network device comprising a memory for storing information about network devices and/or network services available in the network, a data packet scanner connectable to the network to scan data packets containing at least a destination address field and/or a source address field, regardless whether the data packets are addressed to the network device or not, an address field evaluator coupled with the data packet scanner to receive the address value in the address field and adapted to evaluate the destination address and/or the source address and to generate an evaluation signal, and an information updater coupled with the evaluator and adapted to update the information stored in the memory in response to the evaluation signal.

That means in other words that the network device comprises a circuitry adapted to carry out the method according to the present invention.

Hence, the network device according to the present invention is equipped with circuitry which is adapted to listen on the network data traffic and to gain information, particularly address information, therefrom, which is then used to update the information about the network devices and/or network services.

Since the network device has the same advantages as the method described above, it is refrained from repeating them.

In a preferred embodiment, said address field evaluator comprises a search unit adapted to search the information for a network device having the source address provided by the data packet scanner. Additionally or alternatively, said address field evaluator comprises a search unit adapted to search the information for a network device having the destination address provided by the data packet scanner.

As already mentioned before, the destination address, preferably together with an acknowledgement information, and/or the source address contained in a data packet is a valuable information for updating the information. It is also conceivable that further information contained in a data packet may be used for updating the information, for example to update the information about services available in a network. Such services may, for example, be Internet services.

In a further preferred embodiment, the network device comprises an HDMI controller allowing communication via the consumer electronic control bus (CEC bus).

The object of the present invention is also solved by a network having at least one network device according to the present invention and described above.

The object of the invention is also solved by a computer program comprising program code means for causing a network device to perform the steps of said method as claimed in any of claims 1 to 8 when said computer program is carried out on said network device.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

The present invention is based on the idea to monitor data packets transmitted over a network and to use the information contained in the data packets for updating the information about the network devices and/or services available. Hence, the update of the information is achieved in a passive way, meaning that no data packets have to be generated and transmitted for this purpose.

BRIEF DESCRIPTION OF DRAWINGS

These and other aspects of the present invention will be apparent from and explained in more detail below with reference to the embodiments described hereinafter. In the following drawings
FIG. 4 shows a block diagram of a network device.

DESCRIPTION OF PREFERRED EMBODIMENTS

Figure 1:
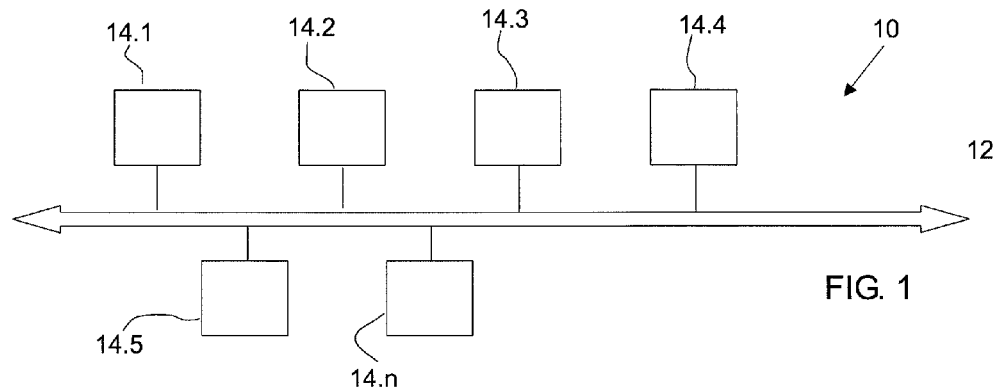
FIG. 1 shows a block diagram of a network.

In FIG. 1, the structure of a network is schematically shown and indicated with reference numeral 10. Generally, the network 10 comprises a network bus 12, a number n of network devices 14.1-14.n. The well known Local Area Network (LAN) based on Ethernet is an example for such a network. The network devices 14.1-14.n may be identical or different devices, like personal computers, TV sets, or, for example, any other network-compatible multimedia device.

Figure 2:
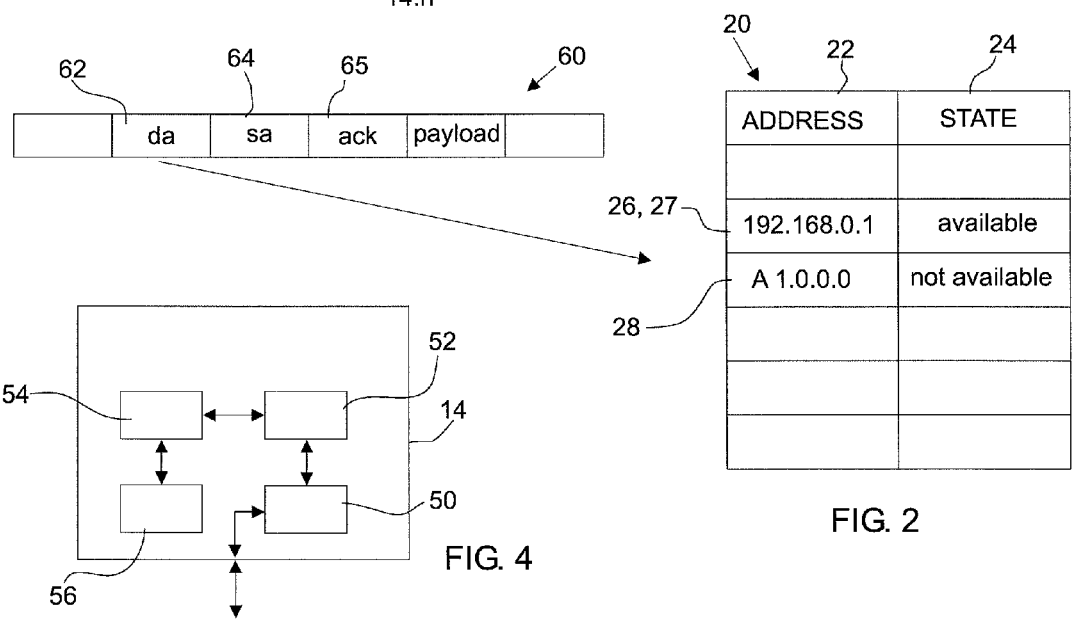
FIG. 2 shows an example of a list of network devices available in a network.

In many applications it is desirable and necessary that at least one, preferably each of the network devices 14 stores information about devices and/or services available on the network. Such information may be structured, for example, as shown in FIG. 2 and indicated with reference numeral 20. Only for illustrative purposes the information is shown in form of a list 20. It is to be noted that other possibilities to structure or organize the information are also conceivable. The invention is not limited to the use of lists 20.

The list—organized in two columns 22, 24 and several rows 26,—contains an entry or record 27, 28 for each network device of the network 10. The first part or field of a record 27, 28 comprises an address of the network device and the second part or field of the record 27, 28 comprises information about the state of the network. In the present embodiment, the state may be "available" or "not available".

"Available" means that the network device is connected with the network bus and is able to communicate, i.e. to send and receive data packets or messages. "Not available", in contrast, means that the network device is not able to communicate, because, for example, it is switched off.

Due to the fact that the state of network devices within a network 10 may change frequently, it is necessary not only to gather information as to generate such a list, but also to update it as often as possible. To update the list 20, the network devices, or at least one of the network devices 14.1-14.n is equipped with circuitry for updating the list. In FIG. 4, the functional units of such circuitry are schematically shown.

The circuitry for updating the list 20 comprises a data packet scanner 50, which is coupled to the network bus 12. The data packet scanner is, in turn, coupled to an address field evaluator 52.

The address field evaluator 52 is coupled with an information updater 54 which is adapted to update the information 20, here the list 20, which is stored in a memory 56.

This circuitry, particularly the functional units 50, 52, 54 and 56, operates as follows:

As it is known in the art, the communication between network devices 14 over the network bus 12 is based on data packets, for example, Ethernet packets. A part of such a data packet is shown in FIG. 2 and indicated with reference numeral 60.

The data packet 60 according to the present embodiment contains a destination address field 62, a source address field 64 and an acknowledgement field 65. The address field 62 contains the address of the receiving network device (destination), the address field 64 contains the address of the sending network device (source) and the acknowledgement field contains a value indicating whether the data packet is received correctly by the destination. In particular, the value of the acknowledgement field is one (logic 1) while the source is sending the data packet and if the data packet is understood by the destination the value is set to zero (logic 0) by the destination. The data packet 60 comprises further fields, for example one containing the payload of the data packet.

Such network data packets 60 are transmitted between network devices of the network 10 and, hence, over the network bus 12. Since all network devices are coupled to the same network bus 12, the network devices are able to receive every data packet transmitted. However, generally the network devices immediately discard data packets which do not contain the address of the network device as destination address.

According to the present embodiment, the network device uses the data packet scanner 50 to scan each data packet transmitted over the network bus 12 and to extract the destination address, preferably together with the acknowledgement value, and/or the source address from the data packet. This address information, preferably together with the acknowledgement value, is then supplied to the address field evaluator 52.

The address field evaluator 52 reads the source address and performs a search in the list 20, whether the source address is contained.

Assuming that the source address is "192.168.0.1", record 27 of the list 20 is found. Then the evaluator 52 checks the state field of the record 27. If the state is "available", nothing happens and the list is remained unchanged.

However, if the state is "not available", the address field evaluator causes the information updater 54 to update the state field to "available".

Due to the fact that the network device (here with the address 192.168.0.1) has sent a data packet over the network bus 12, another network device is able to recognize that the network device 192.168.0.1 is available. Hence, this information can be used to update the list, although no data packet has been sent just for the purpose of updating.

The address field evaluator 52 can also use the destination address in the event that the data packet also carries an acknowledgement value indicating that the data packet has been received properly. Many network systems use the technique of acknowledging data packets. I.e., the receiving network device sets, for example, an acknowledge bit in the data packet at reception time while the sending device is still sending the data packet.

Hence, this information, namely the destination address, can also be used like the source address. In other words, if the acknowledgement value present in the data packet has a respective value (e.g. logic 0) indicating that the destination is available, the address field evaluator uses the destination address for a search in the list 20 and causes the information updater to update a respective record 27, which comprises the destination's device information, if the state is "not available". The state is then changed to "available".

This mechanism to update the list 20 may also be used for updating information about network services available in the network. A network service is, for example, the Internet.

Figure 3:
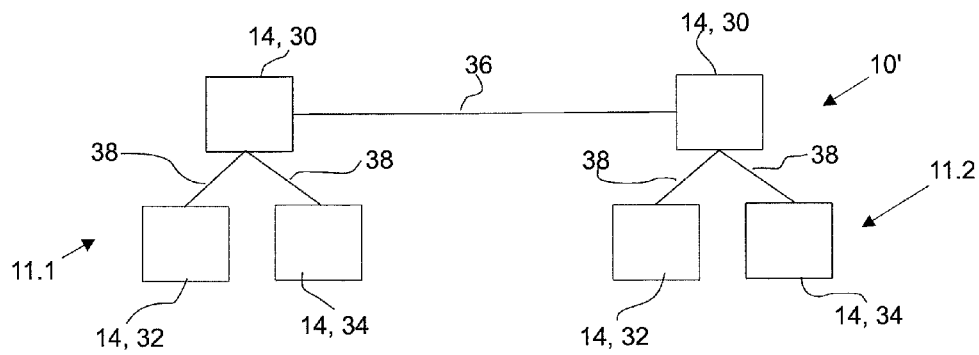
FIG. 3 shows a block diagram of an HDMI network.

In FIG. 3, a further type of a network is shown and indicated with reference numeral 10'. The network 10' is a network comprising a plurality of HDMI networks 11.1, 11.2 interconnected via Ethernet. Each HDMI network, comprising a plurality of network devices 14 which are coupled via HDMI cable 38.

The first HDMI network 11.1 comprises, for example, a TV set 30, a Blu-ray player 32 and a set-top box 34. The Blu-ray player 32 and the set-top box 34 are each coupled with a TV set 30 via HDMI cable 38.

The second HDMI network 11.2 also comprises a TV set 30, a Blu-ray player 32 and a set-top box 34, the last two devices being connected with the TV set via HDMI cable 38. In order to connect both HDMI networks with each other, both TV sets 30 are connected via an Ethernet cable 36.

Although the structure of such a network 10' is different to the network shown in FIG. 1, the mechanism for updating the information about the network devices is the same. The data packets transmitted in an HDMI network also comprises address fields which are called initiator address (similar to source address) and follower address (similar to destination address). They further comprise an acknowledge bit containing acknowledgement information. Further, since the network 10' comprises several HDMI networks 11, the initiator and follower addresses are enhanced with a sub-net identifier. In the list 20, there is, for example, one record 28, which comprises the HDMI address 1.0.0.0 and the sub-net identifier A.

Generally, in an HDMI network, all network devices can simultaneously receive all messages of a CEC (Consumer Electronics Control) and/or CDC data packet, since the serial communication line is physically connected throughout the network. The CEC and/or CDC messages incorporate an initiator address and a follower address as well as one follower asserted acknowledge bit per message block.

On the basis of this information, a network device is able to carry out the above-mentioned steps for updating the list of network devices and/or network services.

To briefly summarize, the embodiments described above offers the following:

1. Network devices that participate in the device and/or service discovery investigate all received messages/data packets even when not addressed to themselves for information about the initiator/source network device. For instance, if the message incorporates an initiator/source address, then the information that the particular initiator/source network device is still participating in the network communication, can be extracted from the message.

2. Network devices that participate in the device and/or service discovery investigate all received messages even when not addressed to themselves for information about the follower/destination device. For instance, if the message incorporates a follower address and an acknowledge bit that is asserted by the follower/destination upon reception, the information that the follower/destination is still participating in the network communication can be extracted from the message when the follower/destination has asserted the acknowledge bit.

3. Advantageously, the present invention also allows to gain information about devices which are not participating in the network communication anymore (referred to as "not available").

4. Network devices that participate in the device and/or service discovery and that poll device and/or service information within certain time intervals may interrupt polling for a certain device and/or service and for a certain time interval whenever the appropriate information has already been discovered, using the mechanisms described before under point 1, point 2 and point 3.

Using this technology allows to enhance a device and/or service discovery. The amount of messages to be sent for the device and/or service discovery automatically adapts inversively to the amount of messages sent by other devices. The technology described above scale well in systems consisting of many devices sending many messages. In case where all devices are sending messages very often, there might even be no need to send any particular device and/or service discovery message anymore.

The present invention describes a technology that makes it possible to implement an enhanced device and/or service discovery. Such a device and/or service discovery is able to discover state changes in a timely manner, while simultaneously reducing the amount of messages necessary to be sent for the device and/or service discovery. Furthermore, an appropriate device and/or service discovery implementation automatically scales to the amount of devices participating in the device and/or service discovery as well as to the amount of messages sent by those devices.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A method for updating information about a plurality of devices that are communicatively coupled to one another via a high-definition multimedia interface (HDMI) network including one or more HDMI cable, the method comprising:
storing, by a first device of the plurality of devices, information about an availability status of each of the other devices of the plurality of devices to communicate via the one or more HDMI cable of the HDMI network;
transmitting, by the first device at predetermined time intervals, a polling message to the other devices of the plurality of devices to update the information;
receiving, by the first device via the one or more HDMI cables of the HDMI network, data packets transmitted by other devices of the plurality of devices over the HDMI network, each of the data packets including a source address field and a destination address field that each identify devices other than the first device; and
for each data packet received by the first device:
determining, by the first device, whether the information includes an availability status of a device identified by the source address field in the data packet;
updating, by the first device when the information does not include an availability status of the device, the information to indicate that the device is available; and
updating, by the first device when the information indicates an availability status of the device as not available, the information to indicate that the device is available, wherein
the predetermined time interval for the transmission of the polling message is extended based on the updating of the information according to the received data packets that include the source address field and the destination address field that identify devices other than the first device.

2. The method according to claim 1, further comprising, for each data packet received by the first device:
reading a source address from the source address field; and
searching the information for a record assigned to a device with the source address.

3. The method according to claim 1, further comprising, for each data packet received by the first device:
reading a destination address from the destination address field;
reading an acknowledgement field of the data packet;
searching the information for a record assigned to a device having the destination address; and
updating, when the information does not include an availability status of the device having the destination address, the information to indicate the device having the destination address.

4. The method according to claim 1, wherein the HDMI network further includes an Ethernet connection.

5. The method according to claim 1, wherein the HDMI network comprises at least two HDMI sub-networks coupled via an Ethernet connection.

6. The method according to claim 1, further comprising sending polling data packets to the other devices to investigate whether their availability is interrupted for a predetermined time period.

7. The method according to claim 1, wherein the information corresponds to a record having a first field for an address of the other devices and a second field for the status of the other devices.

8. A network device that communicates with a plurality of devices over a high-definition multimedia interface (HDMI) network including one or more HDMI cable, the HDMI network communicatively coupling the plurality of devices with the network device, the network device comprising:
a memory; and
circuitry configured to:
store information about an availability status of each of the devices of the plurality of devices;
transmit, at predetermined time intervals, a polling message to the plurality of devices to update the information;
receive, the one or more HDMI cable of the HDMI network, data packets transmitted by the devices of the plurality of devices over the HDMI network, each of the data packets including a source address field and a destination address field that each identify devices other than the first device; and for each data packet:
  determine whether the information includes an availability status of a device identified by the source address field in the data packet;
  update, when the information does not include an availability status of the device, the information to indicate that the device is available; and
  update, when the information indicates an availability status of the device as not available, the information to indicate that the device is available, wherein
the predetermined time interval for the transmission of the polling message is extended based on the updating of the information according to the received data packets that include the source address field and the destination address field that identify devices other than the first device.

9. The network device according to claim 8, wherein the circuitry is further configured to search the information for a device having a source address that is provided in the source address field.

10. The network device according to claim 8, wherein the circuitry is further configured to search the information for a device having a destination address that is provided in the destination address field.

11. The network device according to claim 8, further comprising an HDMI controller allowing communication via a Consumer Electronic Control bus (CEC bus).

12. The network device according to claim 8, wherein the HDMI network further includes an Ethernet connection.

13. The network device according to claim 8, wherein the HDMI network includes at least two HDMI sub-networks that are coupled via an Ethernet connection.

14. The network device according to claim 8, wherein the information corresponds to a record having a first field for an address of the other devices and a second field for the status of the other devices.

* * * * *